July 10, 1934.  M. O. MILLER  1,965,852

NATURAL COLOR PHOTOPLATE

Filed Jan. 11, 1930

Patented July 10, 1934

1,965,852

UNITED STATES PATENT OFFICE 1,965,852

NATURAL COLOR PHOTOPLATE

Max O. Miller, Los Angeles, Calif., assignor of one-twentieth to R. Lee Heath, Los Angeles, Calif.

Application January 11, 1930, Serial No. 420,070

1 Claim. (Cl. 95—2)

My invention relates to photoplates for taking pictures in natural colors and has for its principal object to provide a plate which can be used as are the regular plates for instantaneous exposures instead of the long time exposure required for such plates as now manufactured. I accomplish this by coating the plate with a mass of transparent specks in the necessary colors to reproduce all natural colors appearing in a scene or setting being photographed and then putting the emulsion coating over said coating of color specks of transparent material, whereby the light rays carrying the scene or setting through the plate to the emulsion pass through said transparent color specks before reaching the emulsion, thus carrying the color values in the scene or setting to the emulsion for reproduction.

In order to explain my invention, I have shown on the accompanying sheet of drawings a photoplate embodying my invention, which I will now describe.

Figure 1:
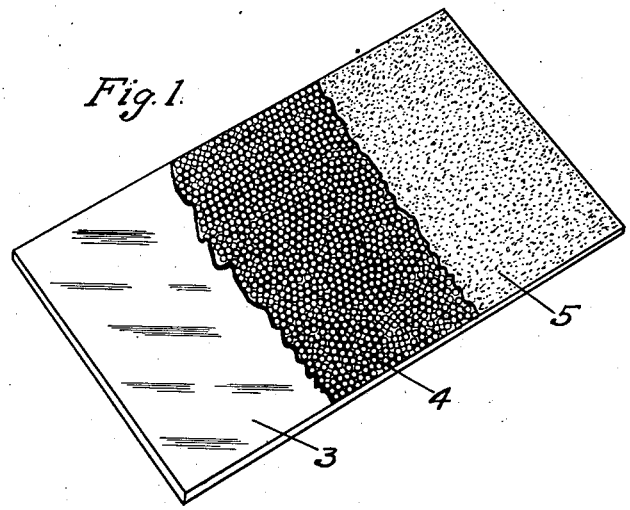
Figure 2:
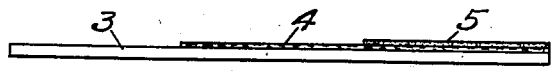

Figure 1 is a perspective view of a photoplate prepared according to my invention, the two layers being broken away in sections to illustrate the arrangement; and Figure 2 is an edge elevation thereof.

In the drawings, 3 designates a glass plate or other suitable plate or sheet of transparent material, coated with a coating 4, made up of a mass of specks of a transparent material and colored in the necessary colors, including blue, green, red and yellow, and over this coating is placed the sensitized emulsion, designated 5.

Different transparent materials can be used for making up the mass of individual, colored and transparent specks which, of course, must be very fine and uniformly mixed in the coating which is applied to the transparent plate or sheet. Powdered glass can be so used and after being colored with suitable dyes in batches and thoroughly mixed, is applied to the transparent plate.

Another material which will serve the purpose is pollen which may range in size from 7000 to 25000 particles or specks to the square inch. After the pollen is selected and prepared as to size, it is bleached to eliminate any color there may be in it. It is then divided into four parts and dyed red, green, blue and yellow. It is thoroughly mixed together and spread evenly on the plate. A protecting coat of transparent varnish or other suitable binder can be used if desired, or the sensitized emulsion can be applied directly thereto, so that the plate becomes a complete, self-contained natural color photoplate which can be used in any camera in the usual way. By means of my improved plate, I eliminate the necessity for time exposure as is the requirement at present.

Another method of preparing my new plate for the purpose described is to use powdered glass and after coloring different batches of it the desired colors with suitable dyes and thoroughly mixing the colors all together, is to sprinkle it on a soft sheet of glass being formed and press it into the sheet of glass so that it becomes a part of said glass as said glass hardens, thus manufacturing a glass sheet or plate with one side provided with a fine mixture of colored, powdered glass pressed thereinto and made a part thereof and all transparent and ready to receive the emulsion.

While I have shown and described the preferred embodiments of my invention, I do not intend to limit my invention to any particular embodiment thereof, except as I may be limited by the hereto appended claim.

I claim:

A new photographic plate for taking still pictures in natural colors and consisting of a glass plate, a layer of powdered glass colored with the necessary colors to form in combinations all of the natural colors and including red, green, blue and yellow, thoroughly mixed and imbedded in said glass plate, and a coating of sensitized emulsion on said plate.

MAX O. MILLER.